Figures 1, 2:
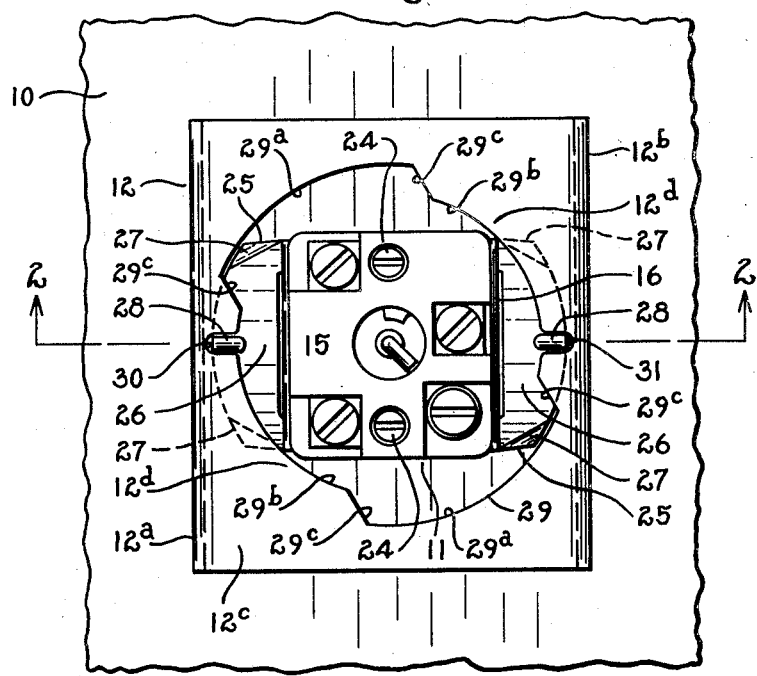

Aug. 5, 1952 — C. W. KUHN — 2,606,061
THERMOSTATIC CONTROLLER MOUNTING
Filed Dec. 20, 1948

Inventor
Clarence W. Kuhn
By W. C. Lejon
Attorney

Patented Aug. 5, 1952

2,606,061

UNITED STATES PATENT OFFICE 2,606,061

THERMOSTATIC CONTROLLER MOUNTING

Clarence W. Kuhn, Wauwatosa, Wis., assignor to Cutler-Hammer, Inc., Milwaukee, Wis., a corporation of Delaware Application December 20, 1948, Serial No. 66,252

4 Claims. (Cl. 297—9)

This invention relates to thermostatic controller mountings.

Thermostatic controllers of the clamp-on type which are mounted with their thermally responsive elements in direct heat exchange relation with the wall of a hot water storage tank have become increasingly popular for control of the water temperature in water heating systems and it is a primary object of the present invention to simplify and expedite mounting of controllers of this type, and Another object of the invention is to provide for facility of mounting and also demounting such thermostatic controllers without need of tools.

Other objects and advantages of the invention will hereinafter appear.

The accompanying drawing illustrates a preferred embodiment of the invention which will now be described, it being understood that the embodiment illustrated is susceptible of various modifications without departing from the scope of the appended claims.

In the drawing:

Figure 1 is a view in front elevation showing a portion of a tank wall, a thermostatic controller and a mounting bracket holding said controller in mounted relation with said tank wall, and Fig. 2 is a view taken along the line 2—2 of Fig. 1 with certain of the parts being shown in section while others are shown in side elevation.

Referring to the drawing, it shows a fragmentary portion of a tank wall 10 on which a thermostatic controller 11 is adapted to be mounted by interengagement of parts thereof with portions of a mounting bracket 12 which is attached to the tank wall.

Thermostatic controller 11 comprises a thermally responsive power element or thermostat 14 and an electrical terminal block 15 projecting from opposite ends of a supporting frame 16. The thermostat 14 is provided with an integrally formed rigid metal casing 17 having a cylindrical side wall 17a, a rectangular flange 17b extending laterally from the upper end of said side wall, and a flat bottom end wall 17c. A fiber gasket 18 having a shape corresponding to that of the flange 17b is interposed between the latter and the adjacent end of the frame 16. A plurality of screws 19 which are accommodated within suitable alined openings formed in the flange 17b and gasket 18 adjacent each of the four corners thereof and which take into threaded openings or recesses in said frame provide for securement of frame 16, casing 17 and gasket 18 in assembled relation.

A thin metallic diaphragm 20 extends transversely across the inside of casing 17 and is suitably secured to the inside of the wall 17b of said casing to form a sealed chamber 21 therewithin. Chamber 21 is provided with a limited fill of suitable thermal fluid. As will be understood diaphragm 20 is adapted in accordance with changes in the thermal condition of the fluid in chamber 21 to move away from and toward the end wall 17c of said casing. An operating member 22 having a shallow cup shaped end portion 22a which bears against the upper surface of diaphragm 20 is adapted to effect operation of contact mechanism (not shown) carried within frame 16, in accordance with the movements of said diaphragm. The movements of said diaphragm is opposed by a loading spring 23 which at its lower end bears against the interior end wall of portion 22a of member 22.

The terminal block 15 is secured to frame 16 by a pair of screws 24 which penetrate suitable clearance openings extending through said block and take into threaded openings formed in the upper end of said frame.

Frame 16, which is built up to be closed on all sides thereof, is provided with a pair of like wing portions 25, 25 which respectively extend laterally from opposite sides of said frame. Said wing portions are resilient and each in edge elevation is bowed slightly toward the block carrying end of said frame. Wing portions 25 are each provided with a convex front surface 26 and a pair of flat corner portions 27, 27 which respectively merge with the surface 26. Each such surface 26 has a boss 28. The end edges of said wing portions are preferably of an arcuate form as shown in Fig. 1; the arcs defining said edges being parts of a circle.

Bracket 12 preferably is of channel shape and is formed as by punching and stamping a piece of sheet metal. As shown in Fig. 2 the bracket comprises leg portions 12a and 12b integral with a flat connecting portion 12c which as shown in Fig. 2 is rectangular, the leg portions being provided to engage the tank wall for support of the flat portion 12c in spaced relation to the tank wall. Portion 12c is provided with a central opening 29 which is symmetrical with respect to a central point and is bounded by two sets of arcuate edges 29a and 29b differing in radius and four straight edges 29c which connect the edges 29a and 29b. The edges 29a have the same radius and are diametrically opposed, preferably, in such relation to the portion 12ᶜ that they would be intercepted substantially centrally by a line diagonal of the portion 12ᶜ from corner to corner of the latter. The radius of curvature of the edges 29ᵃ is somewhat greater than the radius of curvature of the aforementioned end edges of the controller wing portions 25. The arcuate edges 29ᵇ have the same radius which is shorter than the radius of the edges 29ᵃ, said edges 29ᵇ also being diametrically opposed whereby bracket 12 is afforded arcuate shoulders 12ᵈ, 12ᵈ projecting toward the center of opening 29. Such shoulders 12ᵈ are provided with notches 30 and 31, respectively, which preferably are diametrically opposed and which are of a form complementary to the bosses 28 of wing portions 25 of controller 11. Bracket 12 may be attached to the tank wall in any preferred way as by welds 32 and 33 between the leg portions 12ᵃ, 12ᵇ and the tank wall.

If lagging or insulation is applied to the tank wall an opening therein conforming to the size and shape of the portion 12ᶜ of bracket 12 should be provided thus to avoid obstructing the space within the bracket.

As it stands in the drawing controller 11 is in its mounted relation with respect to the tank wall 10 which is brought about by a push turn manipulation of controller 11 relative to bracket 12. In such relation the surfaces 26 of the resilient bowed wing portions bear against the rear or under sides of the shoulders 12ᵈ of the mounting bracket to secure the controller and to press the end wall 17ᶜ of rigid casing 17 of the thermostat or power element 14 against the tank wall, any variations in the spacing of the portion 12ᶜ of the mounting bracket from the tank wall being taken up within limits. Also in this relation the bosses 28 of the wing portions enter the notches 30 and 31 to afford locking of the controller in its mounted relation. The locking afforded by the entrance of bosses 28 into the notches 30 and 31 is of the snap-catch type and is capable of maintaining the controller in mounted relation except when intentionally displaced therefrom.

Controller 11 is demounted in the following manner. As viewed in Fig. 1 the controller is bodily rotated in the clockwise or counterclockwise direction. Initially such movement of the controller, due to the resiliency of said wing portions, causes cam action between the bosses 28 and the shoulders 12ᵈ of bracket 12 and said bosses are caused to move out of the notches 30 and 31. Such bodily movement of the controller is thereafter continued until said wing portions disengage from said bracket and the end edges thereof are alined with the edges 29ᵃ of opening 29. Then the controller is withdrawn from the opening 29 to complete the demounting thereof with respect to tank wall 10.

To effect mounting of controller 11 from a demounted relation it is merely necessary to follow the reverse of the steps set forth above for demounting the same. The desired mounted relation being completed when the bosses 28 of said wing portions snap into place within the notches 30 and 31 of bracket 12.

As will be appreciated the arrangement of the opening 29 and the notches 30 and 31 in bracket 12 is such that in effecting mounting of the controller following insertion thereof through said opening the desired mounted relation is most readily effected by bodily rotating the controller in the counterclockwise direction as viewed in Fig. 1. Similarly demounting of the controller is most readily effected by bodily rotating it in the clockwise direction. However, such rotatons required for mounting and demounting of the controller may just as well be made in the reverse of the directions last indicated although requiring greater degrees of rotation of said controller.

As will be understood by those skilled in the art hot water storage tanks used in domestic water heating systems are commonly of cylindrical form. The diameters of these tanks vary according to their capacities but the vast majority fall within certain limits with respect to their diameters. The preferred form of the wing portions 25 of the controllers hereinbefore shown and described, particularly with respect to their resilient character, the bow imparted thereto, and the form of their curved surfaces 26, permits the mounting of the controllers on cylindrical tank walls having different radii of curvature, such as are commonly met with in domestic water heating systems, without need for a variety of different sizes for the mounting bracket 12 used in conjunction therewith. While the pressure of the power element against the tank may vary with curvature of the tank wall this does not affect the power element functionally because of the rigidity of its casing 17 and its rigid connection to the controller. Thus, within limits, a single size for the bracket 12 may be established and variations in spacing between the tank walls and the portions 12ᶜ of said bracket will be automatically compensated for by the wing portions 25 of the controller when the latter is secured to the tank walls in mounted relation.

I claim:

1. The combination with a thermostatic controller having a thermally responsive power element with an exposed rigid heat conducting extremity in fixed position on said controller, of a supporting bracket for said controller through which said rigid extremity of said power element may be projected, said bracket having a part for attachment to a wall to be engaged by said rigid extremity of said power element, and said controller and said bracket having interengaging parts releasably interlocking the same in a relation with said extremity of said power element projected through said bracket, and certain of said interengaging parts being resilient to effect pressure engagement of said extremity of said power element with the aforementioned wall.

2. The combination with a thermostatic controller having a thermally responsive power element with a rigid heat conducting casing rigidly attached to the controller, of a supporting bracket for said controller comprising a plate through which a portion of said controller inclusive of the end of said casing may be projected, said bracket having parts for attachment to the wall of a tank or the like and to definitely space said plate from said wall, said controller and said bracket having interengaging parts to secure the former to the latter, said interengaging parts including laterally extending resilient wings on said controller which also may be projected through said plate and interlocked with parts of said plate upon rotary movement of said controller, said resilient wings being curved for wedging into interlocking relation with said plate and effecting pressure engagement of said casing of said power element with the aforementioned wall.

3. A thermostatic electrical controller comprising a supporting frame, a substantially rectangular electrical terminal block secured to one end of said frame, a thermally responsive power element having a rigid casing secured to the opposite end of said frame, and resilient wings on said frame extending laterally on opposite sides therefrom for releasably interlocking with a bracket of suitable form mounted on a wall to secure said controller in position with said casing in pressure engagement with such wall.

4. A thermostatic electrical controller comprising a supporting frame, a substantially rectangular electrical terminal block secured to one end of said frame, a thermally responsive power element having a rigid casing of closed end cylindrical form secured to the opposite end of said frame, and resilient wings on said frame extending laterally on opposite sides therefrom for releasably interlocking with a bracket of suitable form mounted on a wall to secure said controller in position with the closed end of said casing in pressure engagement with such wall.

CLARENCE W. KUHN.

REFERENCES CITED

The following references are of record in the file of this patent:

UNITED STATES PATENTS

| Number | Name | Date |
|---|---|---|
| 1,633,908 | Schnepp | June 28, 1927 |
| 1,892,858 | Staley | Jan. 3, 1933 |
| 2,267,541 | Van Houten | Dec. 23, 1941 |
| 2,460,762 | Minnich | Feb. 1, 1949 |